Oct. 11, 1960 — R. F. RAY ET AL — 2,955,787
AUXILIARY FUEL TANK
Filed Dec. 27, 1956 — 2 Sheets-Sheet 2
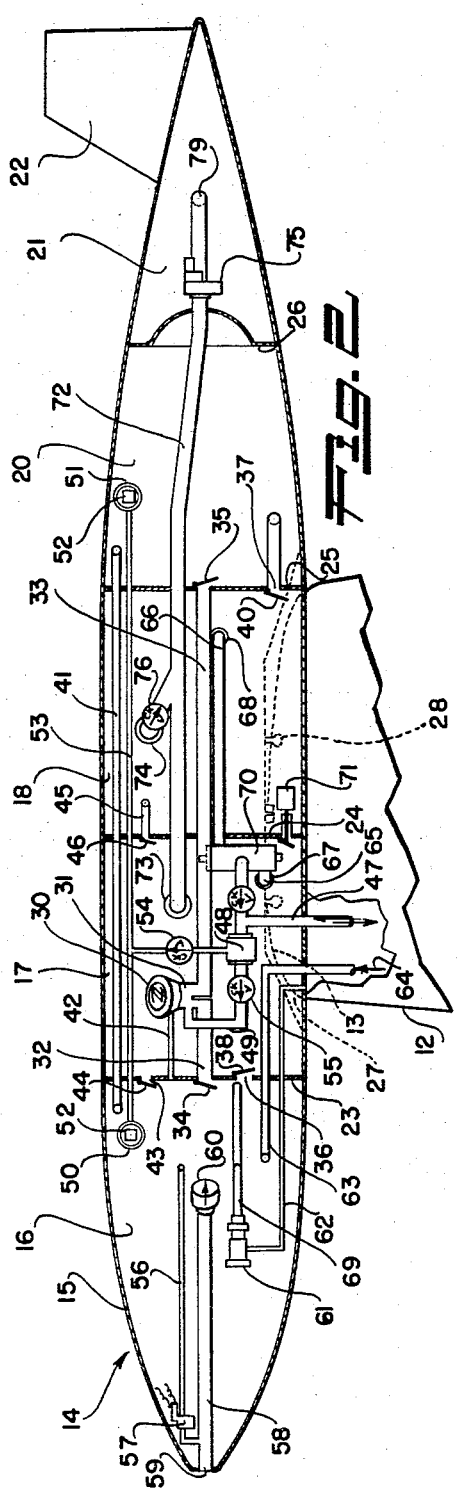
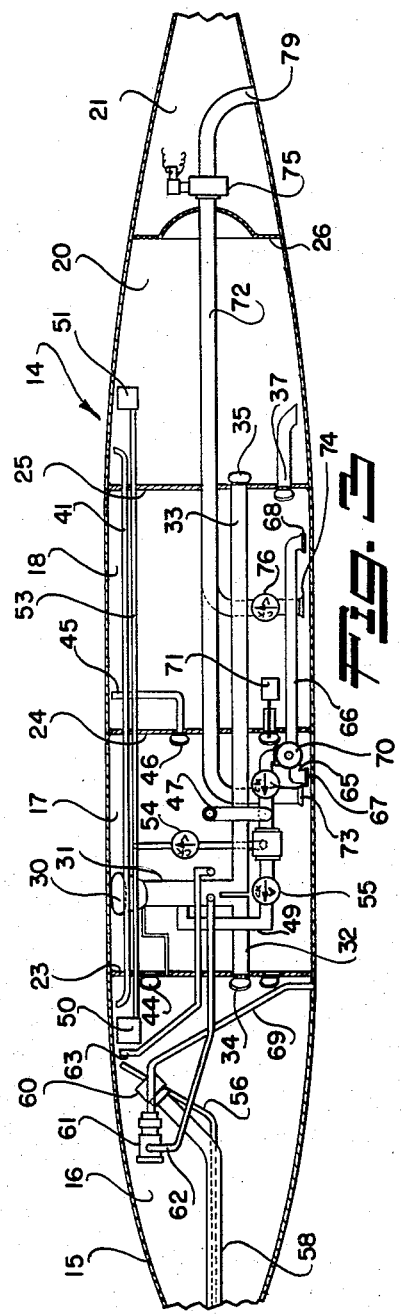
INVENTORS
ROBERT F. RAY
ELDRED S. ANSELL
GLENN R. STEPHENS
By George C. Sullivan
Agent

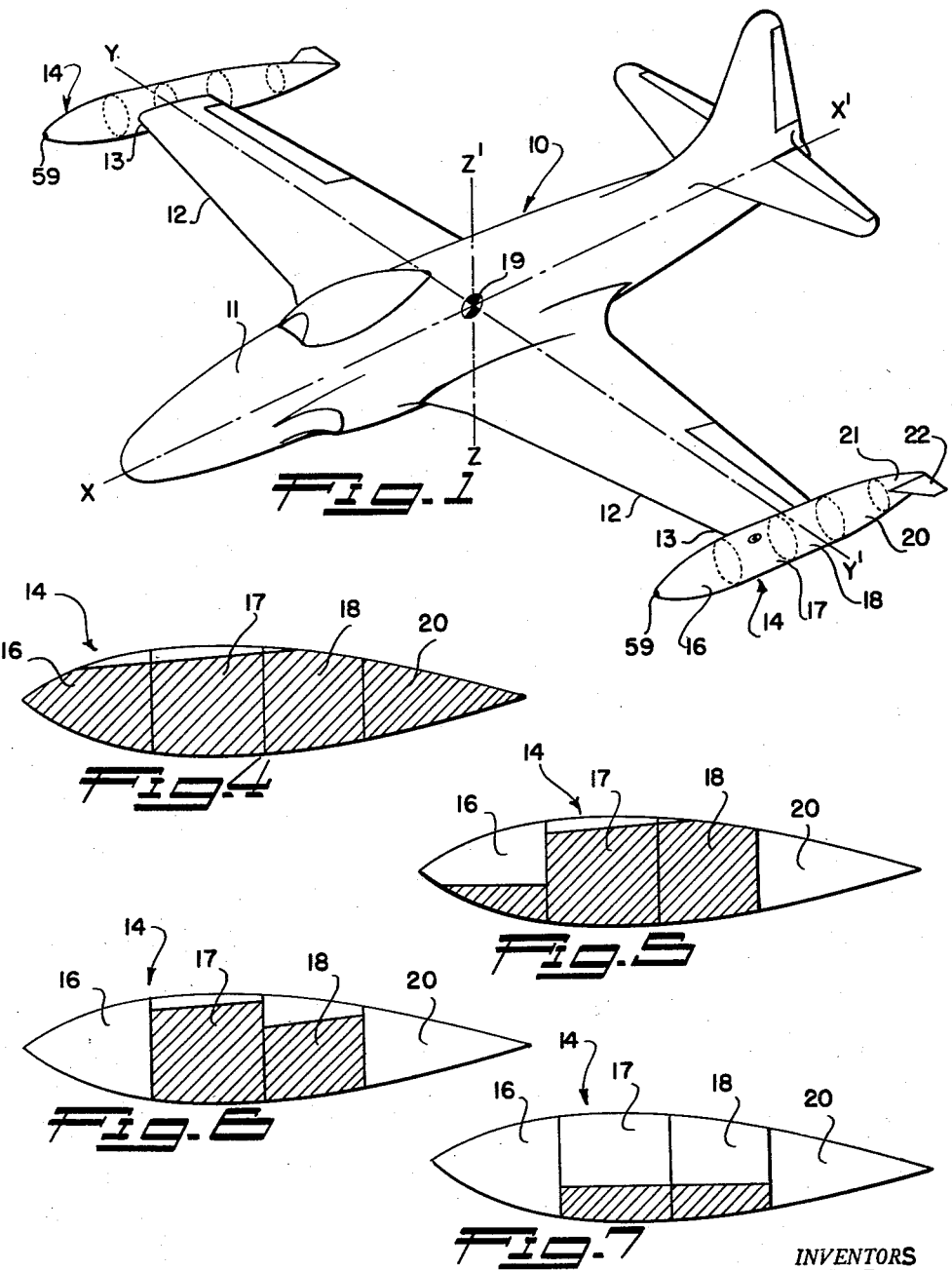

United States Patent Office 2,955,787
Patented Oct. 11, 1960

2,955,787

AUXILIARY FUEL TANK

Robert F. Ray, Pacoima, Eldred S. Ansell, Granada Hills, and Glenn R. Stephens, Glendale, Calif., assignors to Lockheed Aircraft Corporation, Burbank, Calif.

Filed Dec. 27, 1956, Ser. No. 630,885

5 Claims. (Cl. 244—135)

This invention relates to air-borne fluid containing equipment such as auxiliary fuel tanks for aircraft and more particularly to an auxiliary fuel tank or container susceptible to rapid fuel dumping and having suitable center of gravity control.

Jettisonable fuel tanks, for example, have been employed on aircraft for some time because of the added range provided thereby and the fact that the use of such auxiliary tanks when carried suspended from the wings or carried on the wing tips actually reduces the aerodynamic stresses imposed on the wing structure as compared to installing an equivalent weight within the fuselage of the aircraft. In practice, however, difficulties have been encountered in fuel dumping and in controlling the center of gravity of an aircraft having such tanks which are due to the shifting of fuel contained within the tanks which affects the stability of the aircraft during flight. To compensate for this center of gravity shift, particularly in a nose up or nose down attitude, the pilot is required to manually trim his aircraft which greatly affects maneuverability and introduces the possibility of pilot error.

These difficulties are overcome in accordance with the present invention which provides an auxiliary fuel tank having a plurality of compartments for storing a fluid. These compartments are interrelated by means of tubing and valves so that fluid flow from the compartments may be regulated automatically to prevent uncontrolled disposition of the fluid which would cause the shifting of the aircraft center of gravity. In addition, means are provided for rapid fuel dumping whereby a substantially stable tank center of gravity is maintained so that the tank need not be necessarily jettisoned to dump fuel.

It is an object of the present invention to provide an auxiliary fuel tank having a controllable center of gravity within a range of aircraft attitudes from a tank full to a tank empty condition.

Another object of the present invention is to employ an auxiliary fuel tank having means for proportioning or distributing fuel between a plurality of compartments so that more fuel is transferred from aft compartments than from the forward compartments in order to maintain a constant tank center of gravity hence, a stable aircraft.

Still another object is to provide means whereby fuel contained in an auxiliary fuel tank may be readily and rapidly expelled from the tank by employing pressure differential techniques within the tank and without the necessity of jettisoning the tank.

A further object of the present invention is to provide an aircraft auxiliary fuel tank with a center of gravity control capable of automatically regulating the tank center of gravity within specified limits.

Other objects and advantages of our invention will be apparent from the following specification and the accompanying drawings, which are for the purpose of illustration, in which:

Fig. 1 is a perspective view showing a jet powered airplane having auxiliary fuel tanks, in accordance with the present invention, carried on the tips of the wings;

Figure 2 is a top plan view of the auxiliary fuel tanks employed on the wing tips of the airplanes shown in Figure 1;

Figure 3 is a side sectional view of the auxiliary fuel tank shown in Figure 2; and Figures 4–7 are schematic views showing the sequence of fuel storage in the plurality of tank compartments during dumping operations or during normal engine consumption.

Referring to Figure 1, an airplane 10 is shown which is powered with a jet engine (not shown) mounted in a fuselage 11 which has a wing 12 secured to each side thereof. Secured to a wing tip 13 of each wing 12 is an auxiliary fuel tank 14 constructed in accordance with our invention.

For successful flight, airplane 10 must have a certain inherent stability. That is, aircraft 10 may be considered stable and balanced when it returns to equilibrium of itself after meeting atmospheric disturbances. Equilibrium of the airplane is reached when the airplane balances about its center of gravity. In the present instance, airplane 10 has its center of gravity 19 located by the intersection of three axes, namely:

The XX' axis is the longitudinal, rolling, or fore-and-aft axis.

The YY' axis is the lateral, pitching, or athwartship axis.

The ZZ' axis is the normal, yawing, or vertical axis.

Thus, it can be seen that one method of controlling the center of gravity 19 of airplane 10 is to automatically distribute or proportion the fuel contained in tanks 14 between its aft and forward ends to effect longitudinal stability about the pitching or YY' axis. Conversely, it can be seen that unregulated disposition of fuel within the tanks, such as when the airplane descends or climbs, could adversely affect the location of the center of gravity 19 and hence, establish an undesirable longitudinal stability condition.

Since the tanks 14 are identical in construction, with the exception that the component portions thereof face in opposite directions, only one of the tanks will be described, it being understood that the components of the oppositely positioned tank are identical but oppositely oriented.

As shown in Figures 2 and 3, tank 14 comprises a hollow shell 15 having a plurality of compartments such as a forward compartment 16, a pair of intermediate compartments 17 and 18, and aft compartment 20 and a tail compartment 21, for example. The compartments 16, 17, 18, 20 and 21 may be formed integrallly or made as separate components which may be secured in end-to-end relation to produce a tank. The shell 15 is substantially cylindrical about the pair of intermediate compartments 17 and 18 and substantially conoidal about forward compartment 16, aft compartment 20 and tail compartment 21 which in combination produces a tank of streamline contour. A stabilizing fin 22 is secured to the shell in the proximity of the tail compartment which extends outwardly from the airplane to aid in the achievement of aerodynamic balance in airplanes using the present improved tank.

The plurality of compartments are separated from adjacent compartments by a plurality of baffles or walls, such as baffles 23, 24, 25 and 26. Those baffles may be suitably secured to the shell interior by welding, for example. A wing tip well 27 is provided in the shell 15 contoured to accommodate the wing tip 13 of wing 12. Clamping means 28 is carried by both the shell within the well 27 and the wing tip 13 so that the tank 10 may be selectively attached or detached from wing 12. It should be noted that the clamping means or any jettisoning means for securing the tank to the wing 12 does not form any part of the present invention intended to be claimed and that any suitable clamps or hangers may be employed to support or connect the tank to the wing by either suspending the tank under the wing or carrying it on the wing tip.

For the purposes of the present invention, compartments 16, 17, 18 and 20 are employed for fuel storing while compartment 21 is not intended to be so used, although this latter compartment may be so used if desired. The sequence of compartment filling is to initially cause the pair of intermediate compartments 17 and 18 to be filled simultaneously via forward compartment 16 and aft compartment 20. When the intermediate compartments are filled, the remaining two compartments will fill.

In order to fill the fuel compartments, a cap 30, exposed exteriorly of shell 15, may be removed for manual filling operations and fuel may be poured into a receiving receptacle 31 having a pair of transferring tubes 32 and 33 coupled thereto which pass through compartments 17 and 18 respectively. Tube 32 terminates at baffle 23 opening into forward compartment 16 while tube 33 passes through baffle 24 and terminates at baffle 25 opening into aft compartment 20. The openings of tubes 32 and 33 are provided with a cover 34 and 35, respectively, which seals the tubes from compartment 16 and 20 when these compartments are pressurized. Compartments 17 and 18 are filled from compartments 16 and 20 by means of openings 36 and 37 provided in baffles 23 and 25 respectively. Covers 38 and 40 are arranged to permit fuel to flow in one direction only so that fuel contained within compartments 17 and 18 cannot flow into the forward or aft compartments from the intermediate compartments. A vent tube 41 supported on baffles 23, 24 and 25 opens into forward compartment 16 and aft compartment 20 in order to vent compartment 20 via compartment 16 by means of a vent tube or atmosphere venting line 42 opening into the latter compartment and having its outer end connected to the receiving receptacle 31 for venting to the atmosphere. Venting is achieved between compartments 17 and 16 by means of an opening 43 and a cover 44 fastened to baffle 23 and between compartments 18 and 17 by means of a tube 45 and a cover 46 secured to baffle 25 at the mouth of tube 45.

For single point filling wherein it is desirable to fill the tip tanks and wing fuel cells or main fuel reservoir (not shown) from a common juncture, a fuel feed line 47 is provided which couples the interior of tank 14 to the wing fuel cells. Line 47 also serves to carry fuel from tank 14 to the wing cells for subsequent supply to the aircraft engines. In the instance of single point filling, an automatic shut-off valve 48 is provided which is responsive to fueling pressures as determined by the closed or unclosed condition of a pair of fuel level pilot valves 50 and 51. These valves are of the float type in which a float 52 moves in response to the level of fuel in compartments 16 and 20 to close or seal a tube 53 connected to valve 48 via a check valve 54. Check valve 54 is arranged to prevent fuel which may be flowing in tube 53 from flowing into valve 48. Valve 48 is a common refueling shut-off valve. This valve operates in a manner which unbalances when the fuel level pilot valves 50 and 51 are closed to restrict the flow of fuel via a tube 49 during single point refueling. A check valve 55 is employed to prevent fuel from reaching the valve 48 during manual fueling operations.

In order to properly vent the tank during single point refueling operations, since tube 42 will not function at this time, a secondary vent tube 56 is provided which communicates compartment 16 with the exterior of tank 14 via a solenoid operated valve 57 and a ram air duct 58 which opens outside the shell 15 at opening 59. Valve 57 is under selective control of the pilot and in its open condition permits compartment 16 to be vented. Conversely, in its closed condition, tube 56 will not serve to vent the tank. Ram air duct 58 is arranged within compartment 16 so that one end passes through the shell to receive oncoming ram air during flight. The end of duct 58 opposite to the end secured to shell 15 is provided with a ram air check valve 60 which opens to admit ram air into compartment 16 during fuel dumping operations to be described later.

To insure that excessive pressures will not build within tank 14 such as if fuel should continue to be poured into the tank when full, an air pressure relief valve 61 is provided having an ambient air reference line 62 which automatically opens to void compartment 16 of fuel via a relief tube 69.

Fuel is withdrawn from tank 14 by initially forcing air through a tank air pressure line 63 in the direction of an arrow 64. This air may be bled from the aircraft engine compressors upon the starting of the engine to pressurize the tank. The increased pressure in forward compartment 16 due to the air supplied by line 63 causes an increase in pressure in aft compartment 20 via vent tube 41 and compartment 17 via opening 36 which urges fuel into a pair of ducts 65 and 66 located within intermediate compartments 17 and 18 respectively. Each duct is provided with bell-mouthed inlets 67 and 68 on one end thereof facing the bottom of the tank and in close proximity thereto. The ends of each duct opposite to the ends provided with inlets 67 and 68 are suitably coupled to a fuel flow proportioner 70 which is of conventional design. The proportioner 70 is adapted to supply fuel to line 47 in accordance with a predetermined ratio of fuel taken from compartments 17 and 18. In one instance, it has been found desirable to draw more fuel from compartment 18 than from compartment 17. A ratio of 1.2 to 1 was found to be most satisfactory since in the one instance since the aft center of gravity and flutter limits of the tank were found to exceed the specified limits.

A fuel level innerflow float valve 71 is provided through baffle 24 near the bottom of the tank to prevent uncovering of inlet 68 due to the proportioning of fuel drawn from compartments 17 and 18. Should inlet 68 become uncovered by the fuel level of compartment 18 so as to supply air to the proportioner, valve 71 will open to allow remaining fuel in compartment 17 to flow into the former compartment to cover inlet 68.

Inasmuch as fuel is withdrawn from compartments 17 and 18, a fuel dumping duct 72 is provided for voiding the tank of fuel having bell-mouthed pick-ups 73 and 74 located in the last mentioned compartments respectively, in close proximity to the bottom of the tank. The tank may be voided by a motor operated fuel dump valve 75 supported on baffle 26 which is under the selective control of the pilot. The end of duct 72 opposite to the end provided with pick-up 73 opens exteriorly of the tank in tail compartment 21 at opening 79 so that voided fuel will not interfere with other parts of the aircraft such as airfoil control surfaces. A check valve 76 is provided in duct 72 to prevent fuel drawn from compartment 17 from flowing into compartment 18 during the fuel dumping operation.

With reference to Figures 4–7, the tip tank compartment fuel transfer sequence is shown which adequately controls the tank center of gravity shift as fuel is drawn from the tank by engine consumption or dumping operation. For purposes of illustration, fuel flow from compartments 18 and 20 is twenty percent greater than fuel flow from compartments 16 and 17, the ratio of fuel flow or the percentage of difference being dependent upon the design parameters of the aircraft. Furthermore, the attitude of the tip tank shown in these figures is intended for purpose of description to simulate approximately one and a half percent nose-up attitude.

For engine consumption, fuel is drawn into bell-mouthed inlets 67 and 68 due to the supply of air provided through tube 63 which pressurizes compartments 16 and 20. The pressure differential between compartments 16 and 20 with respect to the pair of intermediate compartments 17 and 18 causes covers 38 and 40 to open permitting fuel to flow under pressure through openings 36 and 37 into the pair of intermediate compartments. The fuel contained in the latter compartments is urged under pressure through bell-mouthed inlets 67 and 68 to the proportioner 70. The proportioner is adjusted to draw a predetermined amount of fuel from the pair of intermediate compartments and serves to transfer this combined fuel through feed line 47 to the wing fuel cell. As fuel is being transferred from compartment 17 and compartment 18, fuel is continuously being transferred to these compartments from the forward compartment 16 via opening 36 and from aft compartment 20 via opening 37.

Figure 5 represents the status of the tip tank compartments when the fuel contained in compartment 20 has been exhausted and forward compartment 16 is partially full. As the supply of fuel continues to flow through line 47, forward compartment 16 becomes exhausted and cover 38 closes opening 36 due to the pressure of fuel contained in compartment 17. Figure 6 shows compartments 17 and 18 being partially full and with the fuel exhausted in forward compartment 16 and aft compartment 20. With compartments 16 and 20 empty and compartments 17 and 18 partially full, the innerflow valve 71 comes into operation to maintain a constant head pressure between compartments 17 and 18 so that the aft inlet 68 connected to the flow proportioner 70 does not become uncovered. The remaining fuel in compartments 17 and 18 is withdrawn by the forward and aft inlet pick-ups 67 and 68 of the fuel proportioner until the fuel in these compartments is exhausted.

During fuel dumping operations the identical sequence of tip tank compartment fuel transfer is followed with the exception that fuel is drawn from compartments 17 and 18 via fuel pick-ups 73 and 74 combining in dumping duct 72. To initiate dumping operations, fuel dump valve 75 is motor operated by the pilot to open which causes the tank to be de-pressurized through duct 72 and opening 79. Simultaneously with the opening of dump valve 75 air line 64 may be closed to prevent further pressurizing of tank 14. Upon the de-pressurization of tank 14, ram air check valve 60 opens because of the pressure loss and admits ram airflow to provide a pressure differential between the compartments in favor of forward compartment 16 and aft compartment 20.

The various check valves, float valves and openings and covers employed in the present invention to effect controlled transfer of fuel between the compartments may be of any suitable type arranged to pass a fluid in a single direction while blocking fuel flow in the opposite direction thereto. The tubes and ducts may be secured to baffles and coupled to valves by such means as welding, clamps, fasteners, etc.

Having described only typical forms of the invention we do not wish to be limited to the specific details herein set forth, but wish to reserve to ourselves any variations or modifications that may appear to those skilled in the art and fall within the scope of the following claims.

We claim:

1. A fuel supply system for aircraft and the like comprising a container having at least two inner compartments positioned between at least one pair of outer compartments, a two-way fuel line adapted to communicate with a main fuel reservoir of said aircraft and adapted for filling said container and delivering fuel from said container, a receiving receptacle positioned in re-entrant relation to the peripheral surface of said container and disposed within said container and adapted for manual filling of said container, a system of liquid transferring conduits intergrally connected to said fuel line and to said receptacle and having outer openings disposed within said outer pair of compartments of said container, fuel conducting means including a one-way flow opening communicating between each outer compartment and the next adjacent inner compartment and being adapted to pass fluid from said outer compartment to said next adjacent inner compartment; said system of transferring conduits including a plurality of transferring tubes connecting said receiving receptacle with said outer compartments, fluid conducting means connecting said fuel line to said receiving receptacle, said fluid conducting means including tubing and an automatic shutoff valve, said valve being operable through means responsive to the liquid level in two of said compartments; a delivery system comprising a fuel flow proportioner disposed within one of said inner compartments and integrally communicating to said fuel line through tubing, a fuel duct extending from said proportioner to the interior of one of said inner compartments, a second fuel duct communicating the second of said inner compartments to said proportioner; an air forcing system comprising a tank air pressure line communicating with one of said pair of outer compartments, a venting tube connecting said pair of outer compartments, the ends of said venting tube being disposed, respectively, in the upper portion of each of said outer compartments, a tube communicating through a one-way valve the two inner compartments, said container being adapted to deliver fuel under pressure from said air pressure line simultaneously from said outer compartments into said inner compartments and from said inner compartments through said proportioner to said fuel line without critically shifting the center of gravity during the delivering process.

2. A fuel supply system for aircraft and the like as in claim 1, and including a venting means comprising an atmospheric venting line connecting one of said outer compartments to said receiving receptacle, said venting line conducting the displaced air away from said container during manual filling from said receptacle, a secondary venting tube connecting the interior of one of said outer compartments to the exterior of said container and operable through the operation of a remotely controlled solenoid valve.

3. A fuel supply system for aircraft and the like comprising a container having at least two inner compartments positioned between at least one pair of outer compartments, a fuel dumping system and a ram air supply means communicating with one of said outer compartments for supplying a high flow rate of air during the dumping process, said dumping system comprising a pair of pick up tubes, one of said pair of tubes having an opening disposed within the interior of one of said inner compartments, the second of said pair of pick up tubes having an opening disposed within the interior of the second of said inner compartments, a dumping duct communicating said pair of tubes to the exterior of said container, fluid conducting means including a one-way flow opening communicating between each outer compartment and the next adjacent inner compartment and being adapted to pass fluid from said outer compartments to said next adjacent inner compartments, a fuel dumping valve coupled to the dumping duct, a venting tube connecting said pair of outer compartments, the ends of said venting tube being disposed, respectively, in the upper portion of each of said outer compartments; said fuel dumping system and said ram air supply means being operable to dump fluid from said container without critically shifting the center of gravity of said container, and operable to dump fuel successively and simultaneously from distal pairs of outer compartments and to pass fuel from said pair of outer compartments into said inner compartments and from said inner compartments through said pair of pick up tubes through said dumping duct to the exterior of said container.

4. A fuel supply system for aircraft and the like comprising a container having at least two inner compartments positioned between at least one pair of outer compartments, a two-way fuel line communicating with a main fuel reservoir of said aircraft and adapted for filling said container and for delivering fuel from said container, a receiving receptacle positioned in re-entrant relation to the peripheral surface of said container and disposed within said container and adapted for manual filling of said container, a system of liquid transferring conduits integrally connected to said fuel line and to said receptacle and having outer openings disposed within said outer pair of compartments of said container, fuel conducting means including a one-way flow opening communicating between each outer compartment and the next adjacent inner compartment and being adapted to pass fluid from said outer compartment to said next adjacent inner compartment; said system of transferring conduits including a plurality of transferring tubes connecting said receiving receptacle and said outer compartments, fluid conducting means connecting said fuel line to said receiving receptacle, said fluid conducting means including tubing and an automatic shutoff valve, said valve being operable through means responsive to the liquid level in two of said compartments; a fuel delivering system comprising, a fuel flow proportioner disposed within one of said inner compartments and integrally communicating to said fuel line through tubing, a fuel duct extending from said proportioner to the interior of one of said inner compartments, a second fuel duct communicating from the second of said inner compartments to said proportioner; and an air forcing system comprising, a tank air pressure line communicating with one of said outer compartments, a venting tube connecting said pair of outer compartments, the ends of said venting tube being disposed, respectively, in the upper portion of each of said outer compartments, a tube communicating through a one-way valve to the inner compartments, said container being adapted to deliver fuel under pressure from said air line simultaneously from said outer compartments into said inner compartments and from said inner compartments through said proportioner to said fuel line without critically shifting the center of gravity during the delivering process; a fuel dumping system and a ram air supply means communicating the exterior of said container with one of said outer compartments for supplying a high flow rate of air to said container during the dumping process, said dumping system comprising a pair of pick up tubes, one of said pair of tubes having an opening disposed within one of said inner compartments, the second of said pair of tubes having an opening disposed within the interior of the second of said inner compartments, a dumping duct communicating said pair of tubes to the exterior of said container, a fuel dumping valve coupled to the dumping duct; whereby said fuel dumping system and said ram air supply means cooperate to rapidly dump fluid from said container without critically shifting the center of gravity of said container.

5. A fuel supply system for aircraft and the like as described in claim 4, and including a venting means comprising an atmospheric venting line connecting one of said outer compartments to said receiving receptacle, said venting line conducting the displaced air away from said container during manual filling from said receptacle, a secondary venting tube connecting the interior of one of said outer compartments to the exterior of said container and operable through the operation of a remotely controlled solenoid valve.

References Cited in the file of this patent

UNITED STATES PATENTS

| | | |
|---|---|---|
| 1,003,796 | Ragot | Sept. 19, 1911 |
| 2,138,970 | Jones | Dec. 6, 1938 |
| 2,320,913 | Crowell | June 1, 1943 |
| 2,681,192 | Pappas | June 15, 1954 |
| 2,703,607 | Simmonds | Mar. 8, 1955 |
| 2,755,046 | Underwood | July 17, 1956 |
| 2,759,424 | Defibaugh | Aug. 21, 1956 |